ELECTROMAGNETIC PINCH ROLLER ACTUATOR

Filed June 22, 1961 3 Sheets-Sheet 1

INVENTOR.
CHARLES E. MARSHALL
BY Alfred W. Barber
ATTORNEY

ELECTROMAGNETIC PINCH ROLLER ACTUATOR

Filed June 22, 1961 3 Sheets-Sheet 2

INVENTOR.
CHARLES E. MARSHALL
BY Alfred W. Barber
ATTORNEY

INVENTOR.
CHARLES E. MARSHALL
BY *Alfred W. Barber*
ATTORNEY

United States Patent Office 3,125,271

Patented Mar. 17, 1964

3,125,271

ELECTROMAGNETIC PINCH ROLLER ACTUATOR

Charles E. Marshall, Port Washington, N.Y., assignor to Potter Instrument Company, Inc., Plainview, N.Y., a corporation of New York Filed June 22, 1961, Ser. No. 118,905
6 Claims. (Cl. 226—176)

The present invention concerns tape handlers and, in particular, methods of and means for improving the starting characteristics of the pinch roller-capstan type of tape drive.

In a digital record/playback system utilizing recording tape, for example, magnetic tape, the tape is moved back and forth across a record/playback head. In high speed, high density systems, it is important that the starting of the tape from a stopped condition to a full and constant speed be accomplished in the shortest possible time. One of the most widely used methods of moving the tape in a digital system is by means of a continually rotating capstan against which the tape is pressed to provide driving force. An electromagnetically operated roller called a pinch roller is used to do the pressing. A pinch roller in order to operate satisfactorily in a high speed system must have a very short stroke and be capable of very rapid movement. It is common practice to cover the pinch roller with rubber to cushion its impact with the steel capstan through the recording tape. It has been found that in spite of great care taken in the fabrication of the parts and mounting of the pinch roller, that certain irregularities in the results obtained are experienced. For example, the tape does not start to move smoothly as required when suddenly started by the pinch roller and capstan drive described above. The present invention is concerned with methods of and means for improving the tape starting characteristics in a pinch roller and capstan type of system.

It has been found, according to the present invention, that as the electromagnetic actuator of the pinch roller moves bringing the roller into contact with the capstan, that the magnetic circuit exhibits a transient condition reflected in variations in the instantaneous tape speed for as much as a few milliseconds after the instant of contact or start. Since these variations limit the program possibilities of the system, it has been found important to eliminate them. It has been found that as the magnetic circuit of the pinch roller electromagnet closes in bringing the pinch roller into engagement with the capstan that the energy imparted to this roller increases suddenly. This increased energy imparts a force component to the tape causing a change in its speed. It has been found, according to the present invention, that if the current in the electromagnet is dropped to zero for an instant and at exactly the right time, that this increase in energy and its resulting force component can be eliminated. This dropping of the current is accomplished by differentiating the voltage drop across the pinch roller electromagnet and utilizing the sudden voltage change characteristic of the critical point in the electromagnetic travel to trigger a pulse, after an appropriate delay, which is returned to the electromagnet in opposition to the initial driving current whereby the magnet current is dropped to zero. As soon as the desired decreased force in the system has been accomplished the electromagnet current is allowed to assume its normal steady state value. A flip-flop is used in the circuit which is reset at the end of the run command only so that only one reversed current or voltage pulse can be applied to the electromagnet during a start cycle and that this pulse cannot be repeated until after the end of run command has been given. Also the flip-flop automatically opens the loop so that other feed-back than the intended pulse is prevented.

Accordingly, the primary object of the present invention is to provide methods of and means for improving the starting characteristics of a digital information tape recorder utilizing a rotating capstan and pinch roller drive.

Another object is to provide methods of and means for modifying the action of an electromagnetically operated pinch roller to provide better starting characteristics for the tape being pulled.

Still another object is to cushion the action of an electromagnetically actuated pinch roller.

A further object is to modify the mechanical action of an electromagnetically operated pinch roller through the control of its driving current.

These and other objects will be apparent from the detailed description of the various figures of the drawing.

Figure 1:
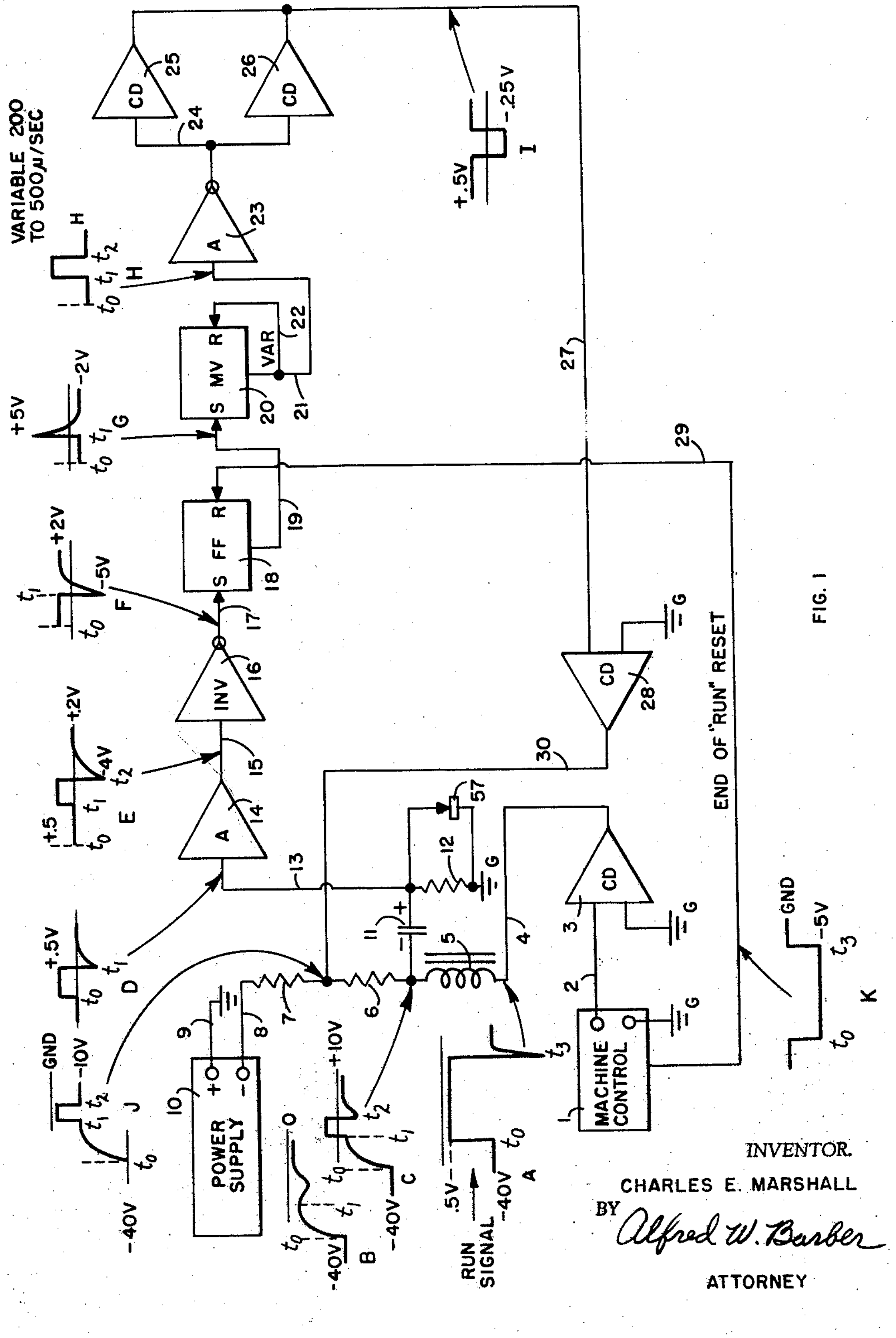
FIGURE 1 is a logic diagram of a preferred form of the present invention.
Figure 2:
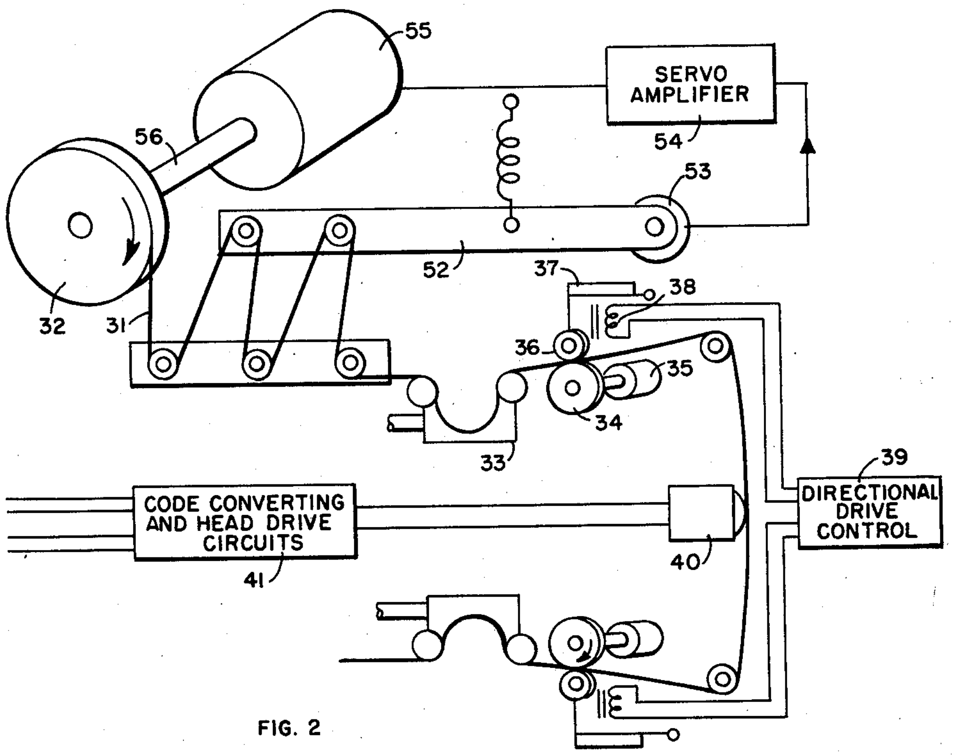
FIGURE 2 is a simplified representation of a tape handler utilizing the present invention.

FIG. 1 is a logic diagram of a system for relaxing the driving current and hence the driving force in the electromagnet moving a pinch roller into engagement with a rotating capstan for pulling tape in a digital information record/playback machine. A typical machine in which this system is useful is shown in FIG. 2 where a tape 31 stored on a reel 32 is driven by capstan 34 whenever the tape is clamped to it by pinch roller 36. Between reel 32 and capstan 34 tension arm 52 and vacuum chamber 33 may be provided for tensioning the tape. Tension arm 52 is connected to transducer 53 which in turn supplies a signal to servo amplifier 54 driving motor 55 and in turn rotating reel 32 over shaft 56 to maintain the position of arm 52 in a predetermined position and hence a predetermined tension on the tape. Capstan 34 is rotated by a suitable motor 35. The electromagnet for moving pinch roller 36 includes a coil 38 and an armature 37. (See FIG. 3 for more details.) The magnet driving current and the current modifying circuits according to the present invention are provided in the directional drive control 39. While not intended to limit the present invention to magnetic recording, a magnetic recording head 40 driven from drive circuits 41 is shown to complete the system. Since it is generally desirable to drive tape in either direction, the reel tension arm, capstan etc. just described is duplicated on the other side of the recording head although only partially shown.

Figure 3:
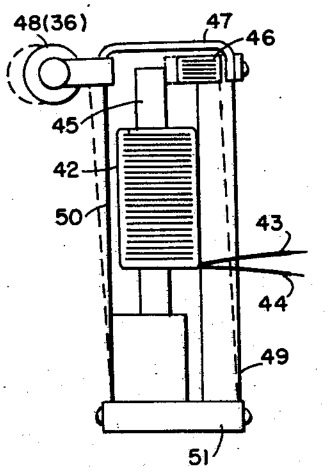
FIGURE 3 is a side view of a electromagnetic pinch roller suitable for use in connection with the present invention.

FIG. 3 shows a typical solenoid electromagnetically operated pinch roller assembly to which the circuits and functions set forth in the present invention particularly apply. The pinch roller 48 is mounted on a yoke 47 supported from end support 51 by flat springs 49 and 50. The pinch roller 48 is moved to its operating position indicated by the dotted lines when solenoid coil 42 on core 45 supplied with suitable current over leads 43—44 draws armature 46 attached to yoke 47 into the position indicated by dotted lines.

Returning to FIG. 1, the pinch roller electromagnet 5 is connected over lead 4 to a current drive amplifier 3 which in turn is connected over lead 2 to machine control 1 where "run" signals are originated by conventional means not shown. The current drive amplifier 3 upon command from machine control 1 in effect shorts lead 4 to ground G so that current flows from power supply 10 over lead 8, through resistors 6 and 7 and through pinch roller electromagnet coil 5.

The command to "run" signal is assumed to be applied at time $t_0$ and will have a form generally as shown by voltage diagram A. The "run" time extends from time $t_0$ to time $t_3$ when it is turned off by the "machine." Since the pinch roller electromagnet 5 has an inductive reactance it will instantaneously support most of the voltage from power supply 10 and the voltage at the junction between resistor 6 and electromagnet coil 5 will start at substantially the full negative voltage of supply 10 and will move toward zero along a curve as shown in voltage diagram B. However, as the pinch roller magnetic circuit gap closes, the inductance will increase and this increase will become very rapid as the gap approaches zero causing an inflection in the voltage curve at time $t_1$. Since this point also corresponds essentially with the instant of contact between the pinch roller and the capstan, it may be used to initiate the sequence of events which results in momentarily dropping the pinch roller electromagnet current to zero to ease the impact and reduce speed variation causing forces from developing. The ensuing sequence of events will be described briefly here in connection with FIG. 1 and in more detail below in connection with the detailed circuit diagram of the system shown in FIG. 2.

Continuing with FIG. 1 the function of the various blocks may be followed by making reference to the lettered voltage diagrams typical of the signals at the points designated by the arrowed lines. At a time just before $t_0$ capacitor 11 will be charged with voltage from supply 10 and with the indicated polarity. As the voltage after time $t_0$ at the junction between resistor 6, inductor 5 and capacitor 11 changes in a positive direction, positive voltage will be impressed across resistor 12 and held to approximately plus 0.5 volt by diode 57 and this positive voltage will keep a cut-off voltage at the input to amplifier 14 over lead 13 as shown in voltage diagram D from $t_0$ to $t_1$. Now at $t_1$ due to the inflection in voltage at this junction point differentiating effect of capacitor 11 and resistor 12 will supply a negative spike as shown at D to the input to amplifier 14 causing it to conduct. This conduction will generate a positive signal on output lead 15 between the times $t_1$ and $t_2$ when conduction ceases at the end of the negative input signal. Inverter 16 provides a positive output on lead 17 from $t_0$ to $t_1$ while its input is zero and a negative spike at $t_1$ when the input goes positive as shown by voltage diagram F. This negative spike applied to the "set" circuit of flip-flop 18 causes it to provide a positive spike at $t_1$ on lead 19 as shown by voltage diagram G. This positive spike triggers multi-vibrator 20 which has a variable time constant feed-back circuit represented by line 22 and generates a variable output pulse on lead 21 as shown by voltage diagram H. This pulse is amplified by amplifier 23 and is applied to two current drivers 25 and 26 having parallel outputs on lead 27 and output voltage as shown by voltage diagram I. This negative going pulse is applied to current drive 28 which by becoming highly conductive robs current from solenoid coil 5 over lead 30. The resulting voltage at the junction between resistors 6 and 7 is shown in voltage diagram J. This voltage which is essentially the voltage across solenoid coil 5 starts at minus 40 volts at time $t_0$, decreases toward ground as the solenoid current builds up, suddenly decreases to nearly zero at time $t_1$ in response to the inflection of the solenoid voltage as described above and thereby substantially reducing the magnetic force to zero until time $t_2$ a length of time determined by multi-vibrator 20 and then assumes its final value at minus 10 volts the magnet holding voltage. At the end of the "run" the machine provides a positive going signal as shown at $t_3$ in voltage diagram K which is applied over lead 29 to reset flip-flop 18. This also holds flip-flop 18 off until a following "run" time $t_0$ so that any intervening signals or noise cannot set the flip-flop. The resultant voltage across solenoid coil 5 is represented by voltage diagram C.

Figure 4:
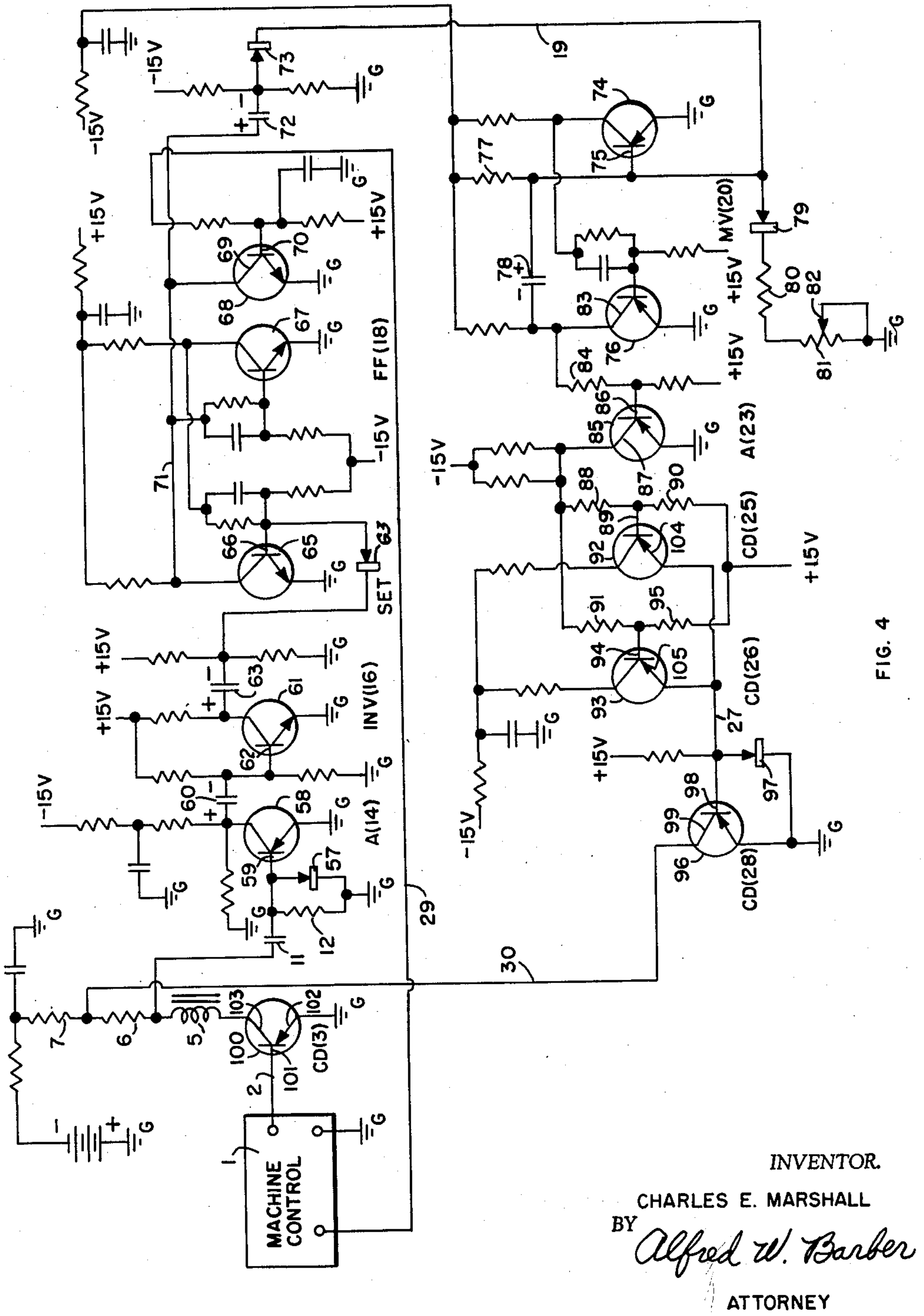
FIGURE 4 is a schematic circuit diagram of the preferred form of the present invention.

FIG. 4 is a detailed schematic of the form of the invention shown partly in block form and described in connection with FIG. 1. Similar numbers and designations to those used in FIG. 1 have been used in FIG. 4 so that the same general description applies to both. Only additional details shown specifically in FIG. 4 will be particularly described below. The current drive 3 may be a p-n-p power transistor 100 with base 101 receiving "run" instruction signals from machine control 1 over lead 2 and with emitter 102 connected to ground G and collector 103 connected to solenoid electromagnet 5. Amplifier 14 may be a p-n-p transistor 58 in a common emitter circuit with input through capacitor 11 and across resistor 12 applied to base 59. The inverter may be an n-p-n transistor 61 coupled to transistor 58 by capacitor 60 connected to base 62. Capacitor 60 in the absence of input signal to transistor 58 supports a voltage with a polarity as indicated. When a signal causes transistor 58 to conduct, the negative end of capacitor 60 becomes essentially grounded placing a positive (conducting) signal on base 62. Flip-flop 18 may include n-p-n transistors 65 and 67 connected in a typical flip-flop configuration and an auxiliary n-p-n transistor 68 operating as a resetting stage and holding flip-flop 18 reset by virtue of machine signals (described above) applied over lead 29 to base 70 and applied to flip-flop 18 from collector 69 over lead 71. As long as transistor 68 is conducting transistor 65 is held on. Flip-flop 18 is set by the discharge of capacitor 63 upon conduction of transistor 61 and through diode 64 to base 66. The negative pulse so supplied "sets" the flip-flop by turning transistor 65 off. With transistor 65 held "on" as described above or "set" it cannot accept further signals so that its only dynamic shift takes place at $t_1$ and does not respond to other signals such as noise. The signal from flip-flop 18 causes capacitor 72 to discharge through diode 73 acting as a threshold limiter over lead 19 to drive multi-vibrator 20 which includes p-n-p transistors 74 and 76. The length of the output pulse at collector 83 generated in response to an input pulse over line 19 to base 75 will be determined by the time constant of the circuit including capacitor 78 and resistor 77 in parallel with resistors 80 and 81 in series. The output pulse width is made variable by variable contact 82 shorting out an adjustable portion of resistor 81. Diode 79 connected between base 75 and resistor 80 blocks current to resistor 80 when base 75 is negative. The pulse generated by multi-vibrator 20 is applied to amplifier 23 consisting of p-n-p transistor 85 having its base 86 coupled to collector 83 through resistor 84. The amplified output of amplifier 23 is applied from collector 87 to the two current drivers 25 and 26 through resistors 88 and 91 and across resistors 90 and 95 to bases 89 and 94 of p-n-p transistors 92 and 93 respectively. Emitter output drive to current drive 28 is supplied from emitters 104 and 105 connected in parallel over line 27 to base 98 of power transistor 96. Diode 97 connected from base 98 to ground sets the cut-off bias of transistor 96 in the absence of conduction drive signal. The shunting of solenoid 5 over lead 30 in response to the signal driven conduction of transistor 96 is provided by connecting lead 30 to collector 99.

While only one embodiment of the present invention has been shown and described, many modifications will be apparent to those skilled in the art and within the spirit and scope of the invention as set forth in particular in the appended claims.

What is claimed is:

1. In a tape handler including an electromagnetically driven pinch roller, the combination of, an electromagnet inductor including means for connecting a voltage source for providing current to the inductor for actuating the pinch roller, first control means connected with the inductor to initiate a flow of current for actuating the pinch roller, and second control means including a differentiating circuit connected to supply a signal in response to an inflection in the voltage across the inductor for momentarily modifying the current flow in said inductor after a predetermined interval, whereby the tendency to develop a change in tape speed due to engagement of the pinch roller is reduced.

2. In a tape handler including an electromagnetically driven pinch roller, the combination of, an electromagnet inductor including means for connecting a voltage source for providing current to the inductor for actuating the pinch roller, first control means connected with the inductor to initiate a flow of current for actuating the pinch roller and including impedance means connected electrically in series with the electromagnet inductor, and second control means to modify a flow of current momentarily after a predetermined interval, whereby the tendency to develop a change in tape speed due to engagement of the pinch roller is reduced.

3. In a tape handler including an electromagnetically driven pinch roller, the combination of, an electromagnet inductor including means for connecting a voltage source for providing current to the inductor for actuating the pinch roller, first control means connected with the inductor to initiate a flow of current for actuating the pinch roller and including impedance means connected electrically in series with the electromagnet inductor, and second control means including electrical connection means to modify the voltage developed across the impedance means during a predetermined interval, whereby the tendency to develop a change in tape speed due to engagement of the pinch roller is reduced.

4. In a tape handler including an electromagnetically driven pinch roller, the combination of, an electromagnet inductor including means for connecting a voltage source for providing current to the inductor for actuating the pinch roller, first control means connected with the inductor to initiate a flow of current for actuating the pinch roller and including impedance means connected electrically in series with the electromagnet inductor, and second control means including electrical connection means to modify the voltage developed across the impedance means during a predetermined interval and including also a differentiating circuit to influence the voltage modification, whereby the tendency to develop a change in tape speed due to engagement of the pinch roller is reduced.

5. In a tape handler including an electromagnetically driven pinch roller, the combination of, an electromagnet inductor including means for connecting a voltage source for providing current to the inductor for actuating the pinch roller, first control means connected with the inductor to initiate a flow of current for actuating the pinch roller, second control means to modify a flow of current momentarily after a predetermined interval, and a current drive amplifier connected electrically in series with the inductor to initiate the flow of current responsive to a predetermined command, whereby the tendency to develop a change in tape speed due to engagement of the pinch roller is reduced.

6. In a tape handler including an electromagnetically driven pinch roller, the combination of, an electromagnet inductor including means for connecting a voltage source for providing current to the inductor for actuating the pinch roller, first control means connected with the inductor to initiate a flow of current for actuating the pinch roller including impedance means and a current drive amplifier connected together with said electromagnet inductor and means for connecting a voltage source, a differentiating circuit means connected between said current drive amplifier and said impedance means, and second control means connected to be responsive to a signal developed by the differentiating circuit means to modify the voltage developed across the impedance means during a predetermined interval, whereby the tendency to develop a change in tape speed due to engagement of the pinch roller is reduced.

References Cited in the file of this patent

UNITED STATES PATENTS

| | | |
|---|---|---|
| 2,877,012 | Angel et al. | Mar. 10, 1959 |
| 3,007,085 | Newman | Oct. 31, 1961 |
| 3,075,682 | Hebb | Jan. 29, 1963 |
| 3,084,310 | Schurr | Apr. 2, 1963 |